United States Patent [19]

Williams et al.

[11] Patent Number: 4,845,137

[45] Date of Patent: Jul. 4, 1989

[54] POLYOLEFIN COMPOSITIONS OF HIGH CLARITY AND RESISTANCE TO OXIDATION

[75] Inventors: Joel L. Williams, Cary; George R. Titus, Raleigh, both of N.C.

[73] Assignee: Becton, Dickinson and Company, Franklin Lakes, N.J.

[21] Appl. No.: 116,830

[22] Filed: Nov. 5, 1987

[51] Int. Cl.$^4$ .............................................. C08K 5/15
[52] U.S. Cl. .................................... 524/108; 549/364; 252/406
[58] Field of Search ...................... 252/406; 524/108; 549/364

[56] References Cited

U.S. PATENT DOCUMENTS

| | | | |
|---|---|---|---|
| 4,016,118 | 4/1977 | Hamada et al. | 524/108 |
| 4,267,110 | 5/1981 | Uchiyama | 549/364 |
| 4,371,645 | 2/1983 | Mahaffey, Jr. | 524/58 |
| 4,374,220 | 2/1983 | Sonnenberg | 524/412 |
| 4,483,952 | 11/1984 | Uchiyama | 524/108 |
| 4,483,956 | 11/1984 | Uchiyama | 524/384 |
| 4,496,679 | 1/1985 | Hambrecht et al. | 524/380 |

FOREIGN PATENT DOCUMENTS

| | | | |
|---|---|---|---|
| 5336 | 2/1977 | Japan | 524/384 |
| 30450 | 3/1981 | Japan | 524/108 |
| 129036 | 8/1983 | Japan | 524/108 |
| 157840 | 9/1983 | Japan | 524/108 |
| 157841 | 9/1983 | Japan | 524/108 |
| 2004289 | 9/1983 | Japan | 524/364 |

*Primary Examiner*—John Kight
*Assistant Examiner*—Kriellion Morgan
*Attorney, Agent, or Firm*—Richard E. Brown

[57] ABSTRACT

Polyolefin compositions having high clarity and resistance to oxidative degradation are obtained with new dibenzylidene sorbitol additives having a sulfur-containing substituent on at least one of the benzylidene rings. Preferred additives are thioethers.

19 Claims, No Drawings

POLYOLEFIN COMPOSITIONS OF HIGH CLARITY AND RESISTANCE TO OXIDATION

FIELD OF THE INVENTION

This invention relates to polyolefin compositions of improved clarity and resistance to oxidation and, more particularly and in addition thereto, relates to a new class of additives which confer these improved properties to polyolefins.

BACKGROUND OF THE INVENTION

For many applications, polymeric products have been fabricated into structural or block forms, such as fibers, which utilize properties based on their high molecular weights. In recent years, applications have been developed, such as plates, sheets, films and the like, in which clarity or transparency is a very desirable property. Clarity is also very important for certain plastic articles, such as syringes, made by injection molding.

In general, clarity is not an inherent property of polyolefin plastics, most of which are more or less opaque due principally to their partially amorphous nature. Most polyolefins do, however, have some crystallinity, and they are generally referred to as semicrystalline. High clarity is thought to be related crystal size. Large crystals reduce clarity, an effect generally thought to be due to diffraction and scattering of light, and most polyolefins of good clarity are predominantly microcrystalline.

Various additives for polyolefins, conventionally referred to as nucleators, which promote crystallization at many sites, have been disclosed. U.S. Pat. No. 4,016,118 to Hamada et al. teaches improved clarity and resistance to mold shrinkage in polyolefins containing from about 0.1% to 0.7% of dibenzylidene sorbitol. Other dibenzylidene sorbitol clarifying additives postulated to function by reducing crystal size are disclosed in U.S. Pat. No. 4,371,645 to Mahaffey and U.S. Pat. No. 4,483,952 to Uchiyama. In the former patent, the phenyl rings are substituted with at least one halogen atom, and may additionally have alkyl, hydroxy, methoxy, amino or nitro substituent groups. The dibenzylidene sorbitols of the latter patent have chloro, alkyl or alkoxy substituents in each of the phenyl rings.

Prior art dibenzylidene sorbitol additives have resulted in polyolefin composition having improved clarity and resistance to shrinkage without loss of mechanical strength. There is, however, a definite need for further improvements, particularly with respect to molded articles which may be subject to subsequent sterilization procedures, such as, for example, heat or radiation, which may lead to discoloration and embrittlement due to oxidative deterioration. It is toward the fulfillment of this need that the present invention is directed.

SUMMARY OF THE INVENTION

One aspect of the present invention is a polymeric composition having improved clarity and resistance to oxidative degradation. A polymer, preferably a polyolefin, is formulated with an antioxidizing and clarifying amount of a dibenzylidene sorbitol substituted with a sulfur-containing substituent. In another aspect of the invention, there is provided a new class of sulfur-substituted dibenzylidene sorbitol additives for polymers having both clarifying and antioxidant properties.

Preferred polymeric compositions in accordance with the invention are polyolefins, most preferably polypropylene. Preferred additives are thioethers of dibenzylidene sorbitol such as alkylthiodibenzylidene sorbitols. The most preferred additive is 4,4'-bis (methylthio)dibenzylidene sorbitol.

In accordance with the invention, the preferred polyolefin composition contains only about 0.15% by weight of the preferred additive, yet has a clarity, as determined by the conventional haze value, equal to the dibenzylidone soribol any polyolefin compositions heretofore disclosed. Further, the polyolefin compositions of the invention exhibit significant resistance to oxidative degradation consequent to the sulfur-substituted dibenzylidene sorbitol additive. None of the prior art additives provides any protection against oxidative degradation at any concentration.

Significant advantages with respect to production costs are also realized with the additives of the present invention. Because high clarity compositions are achieved with only 0.15% of the additive, the total additive package required per batch of polyolefin composition is reduced, resulting in cost savings. Further, since the additives of the invention increase the temperature at which a polyolefin composition in a mold crystallizes, the mold can be opened sooner to remove the contents. The reduced "mold time" provides a savings in time which is translated into a cost saving because the mold can produce more units of product in a given period of time.

DETAILED DESCRIPTION

While this invention is satisfied by embodiments in many different forms, there will herein be described in detail preferred embodiments of the invention, with the understanding that the present disclosure is to be considered as exemplary of the principles of the invention and is not intended to limit the invention to the embodiments described. The scope of the invention will be measured by the appended claims and their equivalents.

The polyolefin component of the composition of the present invention having high clarity and high resistance to oxidative degradation may be a homopolymer or copolymer of an aliphatic monoolefin, preferably with 2 to 6 carbon atoms, having a number average molecular weight of about 10,000 to 200,000, preferably about 30,000 to 150,000. The polyolefins of the present invention may be described as basically linear, but may optionally contain side chains such as are found, for instance, in conventional, low density polyethylene. Exemplary of such polyolefins are polyethylene, polymethylpentene, polytetrafluoroethylene and the like. The preferred polyolefin is polypropylene.

The polyolefin may contain a small amount, generally from 1 to 10 percent of an additional polymer incorporated into the composition by copolymerization with the appropriate monomer. Such copolymers may be added to the composition to enhance other characteristics of the final composition, and may be, for example, polyacrylate, polyvinyl, polystyrene and the like.

The additives having clarifying and antioxidizing properties of the present invention are sulfur-substituted sorbitol derivatives consisting substantially of dibenzylidene sorbitol derivatives of the following general structure:

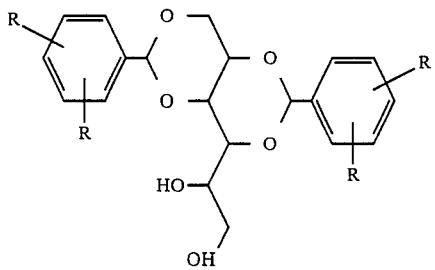

wherein R may be hydrogen, halogen, lower alkoxy, lower alkyl, lower alkylthio, lower alkylsulfoxy or phenylthio wherein the term lower with respect to alkyl or alkoxy is intended to be from 1 to 6 carbon atoms, branched or unbranched, and at least one of the substituent groups is a sulfur containing group. The preferred additives have a lower alkyl thio group in each ring, preferably in the meta or para positions, most preferably in the two para positions.

It is understood with regard to the structural formula set forth above that while only the 1,3:,2,4 isomer is represented, this structure is provided for convenience only and the invention is not limited to isomers of the 1,3:2,4 type, but may include any and all other isomers and mixtures thereof provided that the additive has two benzylidene groups on the sorbitol moiety.

The additives of the invention may be prepared by any suitable sequence of reactions as known in the art. A particularly convenient method is acid-catalyzed condensation of the appropriate substituted benzaldehyde with sorbitol. The stoichiometry of this reaction is two moles of aldehyde per mole of sorbitol, and while the preferred ratio of these reactants is at or close to 2:1, other ratios deviating from this preferred value, but still suitable for preparation of the additives, are readily apparent to one ordinarily skilled in the art. Likewise, selection of suitable solvents, acid catalysts, reaction conditions, workup conditions and product isolation procedures are well within the purview of one skilled in the art. A representative non-limiting synthetic procedure is given in Example I below. The following list of preferred dibenzylidene sorbitol thioether additives is likewise merely representative:

4,4'-bis(methylthio)dibenzylidene sorbitol
3,3'-bis(methylthio)dibenzylidene sorbitol
4,4'-bis(ethylthio)dibenzylidene sorbitol
3,3'-bis(ethylthio)dibenzylidene sorbitol
4,4'-bis(phenylthio)dibenzylidene sorbitol
3,3'-bis(phenylthio)dibenzylidene sorbitol Condensation of a benzaldehyde and sorbitol under the above conditions leads predominately to the dibenzylidene derivative of the invention. It is appreciated, however, that biproduct mono- and tribenzylidene derivatives will also be formed, the quantity of the biproducts formed being variable depending on the reaction workup and purification procedures. In general, it is not necessary to remove these biproducts because the clarifying and antioxidizing effectiveness of the dibenzylidene sorbitols of the invention are not substantially decreased by the presence of the biproducts. It is intended, however, that the additive of the invention consist of 90% or higher of the dibenzylidene sorbitol additive. As known in the art, tribenzylidene biproducts may be substantially removed by extraction or trituration of the crude isolate with a nonpolar solvent, and monobenzylidene biproducts may be removed by recrystallization from a suitable solvent. Such purification techniques are routine and well-known to those skilled in the art.

Clarifying and antioxidizing properties are conferred when the additive of the invention is formulated into the polyolefin composition in a quantity within the range of about 0.005 to 2.0% by weight. Higher percentages of additives may be used but generally provide no perceived advantage. The preferred concentration range may be from about 0.05 to 0.5%, most preferably, from about 0.1% to 0.3%.

Other additives as known in the art may be added to provide other desirable properties to the composition. For example, fillers, coloring agents, plasticizers, antistatic materials, wetting agents and the like may be added in suitable quantities providing no deleterious effects in the desired clarity or mechanical strength are introduced. In addition, other known clarifying additives, as for example, organic acids and metal salts thereof, such as para-t-butylbenzoic acid, may be incorporated into the composition.

Preparation of the composition of the invention from its constituent parts is routine and may be carried out by any conventional mixing means.

Clarity of a polyolefin composition is conventionally reported as the haze value. Haze values of the compositions of the invention may be determined in accordance with ASTM procedure D 1003. In Table I, representative polyolefin-additive compositions of the invention and their haze values are shown and compared with prior art compositions.

TABLE I

| Polypropylene Additive | Concentration (wt %) | Haze (%) Sample = 0.040" |
|---|---|---|
| None | — | 35 |
| 4,4-bis(Methylthio)- dibenzylidene Sorbitol | 0.10 | 10 |
| | 0.15 | 8 |
| | 0.20 | 10 |
| | 0.25 | 10 |
| | 0.40 | 18 |
| | 0.50 | 20 |
| Dibenzylidene Sorbitol | 0.10 | 40 |
| | 0.25 | 20 |
| | 0.50 | 17 |
| 4,4-bis(Chloro)- dibenzylidene Sorbitol | 0.10 | 32 |
| | 0.20 | 21 |
| | 0.30 | 12 |
| | 0.50 | 8 |
| 4,4-bis(Methoxy)- dibenzylidene Sorbitol | 0.50 | 52 |
| 2,2'-bis(Chloro)- dibenzylidene Sorbitol | 0.50 | 50 |

The resistance to oxidation of the polyolefin-additive compositions of the invention may be determined by quantitative measurement of the reduction in free radical concentration in the composition after irradiation. Using electron spin resonance spectroscopy, the concentrations of free radicals in the polyolefins are measured at various time intervals. Samples with the sulfur-containing additives of the invention have been shown to have significantly reduced free radical concentrations relative to either untreated polypropylene or polypropylene containing other nucleating additives.

In Table II, the antioxidant properties of compositions of the invention are compared with those of the prior art.

TABLE II

| Polypropylene Additive | Concentration (wt %) | Temp (°C.) | Dose (Mrad) | % Change in [R.]* |
| --- | --- | --- | --- | --- |
| 4,4'-bis(Methylthio)dibenzylidene Sorbitol | 0.50 | 20 | 2.5 | −34 |
|  | 0.50 | 60 | 2.5 | −31 |
|  | 0.50 | 20 | 7.5 | −14 |
|  | 0.50 | 60 | 7.5 | −13 |
| 4,4'-bis(Chloro)dibenzylidene Sorbitol | 0.50 | 20 | 2.5 | +14 |
|  | 0.50 | 60 | 2.5 | −18 |
|  | 0.50 | 20 | 7.5 | +14 |
|  | 0.50 | 60 | 7.5 | +39 |

*[R.] = free radical concentration Irradiated in air at 0.5 Mrad/hr Stored in air for 24 days

EXAMPLE I

4,4'-Bis(methylthio)dibenzylidene Sorbitol

A mixture of two moles of 4-methylthiobenzaldehyde, one mole of sorbitol, cyclohexane (1000 ml), dimethylsulfoxide (30 ml) and toluenesulfonic acid (3–5 g) was refluxed with vigorous stirring under nitrogen until two moles of water were collected by azeotropic distillation. The reaction mixture was cooled and neutralized with triethylamine. The precipitate was filtered, washed with hot water, hot ethanol and dried to give a yield varying from run to run of 69–85% based on sorbitol.

nmr, ppm: 7.49–7.31(mult., 8H); 5.70(sing., 2h);
4.92(doub., 1H); 4.21(trip., 1H);
3.99–3.39(mult., 8H)
2.57(sing. 6H).

EXAMPLE II

4,4'-Bis(methylthio)dibenzylidene Sorbitol Dioxide

The product from Example I (4.52 gr) was slurried in 125 ml of dioxane and treated with 5.40 gr of m-chloroperbenzoic acid. The mixture was refluxed for two hours and left overnight at ambient temperature. The precipitate was filtered, extracted with 1.0% aqueous NaOH, washed with water and isopropyl alcohol and vacuum dried. The residual white solid disulfoxide gave the following nmr, ppm:

7.95–7.70(mult., 8H); 5.81(sing. 2H);
4.23–3.35(mult., 10H); 2.74(sing. 6H).

EXAMPLE III

Polypropylene (500 g), obtained in pellet form from the manufacturer, was shaken with 4,4'-bis(methylthio)-dibenzylidene sorbitol (2.5 g, finely powdered) to coat the pellets electrostatically. The pellets were then extruded through a single screw extruder at 210° C., cooled in a water bath, and re-pelletized.

The new pellets were then molded into step plaques 50×75 mm in overall dimension by injection molding. The upper step was 0.080 inches thick while the lower step was 0.040 inches thick. The haze values reported in Table I were from 0.040 inch step and were measured using ASTM Method D1003.

EXAMPLE IV

Four samples were cut from step plaques prepared as described in Example III. Four additional samples were cut from step plaques prepared from the same polypropylene resin without any additive. The mass was recorded for all eight samples. These eight samples were divided into two groups of four. One subgroup, consisting of two samples with nucleator and two samples without nucleator, was irradiated with gamma radiation for five hours at 0.5 Mrad/hr to a total dose of 2.5 Mrad. This subgroup was further divided into two groups of two, each containing a nucleated and a non-nucleated sample. These groups of two were then stored in air at 20° C. and 60° C. respectively.

The second subgroup of four, also containing two nucleated and two non-nucleated samples was irradiated at 0.5 Mrad/hr for 15 hours to a total dose of 7.5 Mrad. These samples were then subdivided as described above and stored in air at 20° C. and 60° C. respectively.

The free radical concentration, which is predominantly peroxy free radicals due to constant exposure to air, was then measured at 5,10,16 and 24 days for each sample. As indicated in Table II, the concentration of free radicals in the specimens containing 4,4'-bis(methylthio)dibenzylidene sorbitol were reduced by 13–34% as compared to the base resin after 24 days.

Thus, in accordance with the invention, there is provided new polyolefin compositions of exceptionally high clarity which results from inclusion of new sulfur-containing dibenzylidene sorbitol additives. The new additives also are antioxidants whereby the compositions of the invention exhibit resistance to oxidative degradation. Savings in production costs are also achieved because high clarity is achieved with very low percentages of additive, and because the compositions of the invention have a higher crystallization temperature giving reduced mold times.

What is claimed is:

1. An antioxidizing and clarifying additive for a polyolefin comprising a dibenzylidene sorbitol thioether selected from the group consisting of compounds of the structure

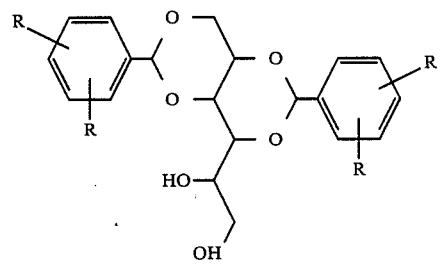

wherein R may be hydrogen, halogen, lower alkoxy, lower alkyl, lower alkylthio, lower alkylsulfoxy or phenylthio wherein the term lower with respect to alkyl or alkoxy is intended to be from 1 to 6 carbon atoms, branched or unbranched, and at least one of the substituent groups is a sulfur containing group.

2. The additive of claim 1 which is an alkyl thioether having from 1 to 6 carbon atoms in the alkyl portion of said thioether.

3. The additive of claim 1 which is a phenyl thioether.

4. The additive of claim 1 which is a monothioether.

5. The additive of claim 1 which is a dithioether wherein one thioether group is in each benzylidene ring.

6. The additive of claim 1 wherein said thioether is a dibenzylidene sorbitol-4-thioether.

7. The additive of claim 1 wherein said thioether is a dibenzylidene sorbitol-3-thioether.

8. An antioxidizing and clarifying additive which is dibenzylidene sorbitol-4,4'-bis(methylsulfoxide).

9. An antioxidizing and clarifying additive for a polyolefin comprising 4,4'-bis(methylthio)dibenzylidene sorbitol.

10. A composition comprising a polyolefin and a clarifying and antioxidizing amount of a dibenzylidene sorbitol thioether selected from the group consisting of compounds of the general structure

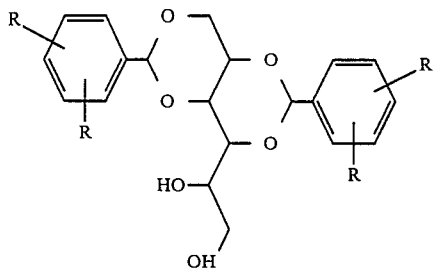

wherein R may be hydrogen, halogen, lower alkoxy, lower alkyl, lower alkylthio, lower alkylsulfoxy or phenylthio wherein the term lower with respect to alkyl or alkoxy is intended to be from 1 to 6 carbon atoms, branched or unbranched, and at least one of the substituent groups is a sulfur containing group.

11. The composition of claim 10 wherein said polyolefin is selected from the group consisting of polyethylene, polypropylene, polymethylpentene and polytetrafluoroethylene.

12. The composition of claim 10 wherein said thioether is an alkyl thioether having from 1 to 6 carbon atoms in the alkyl portion.

13. The composition of claim 10 wherein said thioether is a phenyl thioether.

14. The composition of claim 10 wherein said thioether is a monothioether.

15. The composition of claim 10 wherein said thioether is a dithioether having one thioether group in each benzylidene ring.

16. The composition of claim 10 wherein said thioether is a dibenzylidene sorbitol-4-thioether.

17. The composition of claim 10 wherein said thioether is a dibenzylidene sorbitol-3-thioether.

18. A composition comprising polypropylene and an antioxidizing and clarifying amount of dibenzylidene sorbitol-4,4'-bis(methysulfoxide).

19. A composition comprising polypropylene and a clarifying and antioxidizing amount of 4,4'-bis(methylthio) dibenzylidene sorbitol.

* * * * *